US010696492B2

(12) United States Patent
Sergent et al.

(10) Patent No.: US 10,696,492 B2
(45) Date of Patent: Jun. 30, 2020

(54) NORIA-TYPE DEVICE FOR TRANSPORTING SUPPORT PLATES FOR BAKERY PRODUCTS OR THE LIKE

(71) Applicant: MECATHERM, Barembach (FR)

(72) Inventors: Olivier Sergent, Paris (FR); Damien Pineau, Trementines (FR)

(73) Assignee: Mecatherm, Barembach (FR)

( * ) Notice: Subject to any disclaimer, the term of this patent is extended or adjusted under 35 U.S.C. 154(b) by 0 days.

(21) Appl. No.: 16/442,019

(22) Filed: Jun. 14, 2019

(65) Prior Publication Data
US 2019/0382209 A1 Dec. 19, 2019

(51) Int. Cl.
B65G 47/57 (2006.01)
B65G 17/12 (2006.01)

(52) U.S. Cl.
CPC .......... B65G 47/57 (2013.01); B65G 17/123 (2013.01); B65G 2201/0202 (2013.01)

(58) Field of Classification Search
CPC ....... B65G 17/22; B65G 17/123; B65G 47/57
USPC ............... 198/347.4, 465.3, 468.6, 580, 681
See application file for complete search history.

(56) References Cited

U.S. PATENT DOCUMENTS

| 4,170,285 A | * | 10/1979 | Hinchcliffe | A24C 5/35 198/347.3 |
| 4,178,048 A | * | 12/1979 | Zippel | B65G 21/22 198/799 |
| 4,220,236 A | * | 9/1980 | Blidung | B65G 47/5154 198/347.3 |
| 4,643,495 A | * | 2/1987 | Pepping | B65G 1/127 198/800 |
| 4,909,697 A | * | 3/1990 | Bernard, II | B65G 1/0485 187/255 |
| 4,926,789 A | * | 5/1990 | Wenger | H05K 13/0061 118/668 |
| 4,987,992 A | * | 1/1991 | Pfleger | B65G 17/18 198/475.1 |
| 5,046,911 A | * | 9/1991 | Ogura | B65G 1/127 198/475.1 |
| 5,109,758 A | * | 5/1992 | Voegtlin | A21B 1/44 99/386 |

(Continued)

FOREIGN PATENT DOCUMENTS

| CH | 698202 B1 | 6/2009 |
| DE | 1133683 B | 7/1962 |

(Continued)

Primary Examiner — Joseph A Dillon, Jr.
(74) Attorney, Agent, or Firm — Craft Chu PLLC; Andrew W. Chu

(57) ABSTRACT

The device for transporting support plates for bakery products includes supporting angle brackets on which rest the edges of plates, and a driving device cooperative with the brackets on both sides of a vertical median plane. The driving device includes at least one chain forming a close-loop circuit so as to define an ascending column and a descending column of supporting means and, at least one connecting support hinged about a horizontal axis of at least one angle bracket. There is a device for holding and guiding the angle brackets in a horizontal plane in a transfer portion from the ascending column to the descending column and a conveyer extending at least under the ascending and descending columns between the driving device.

7 Claims, 6 Drawing Sheets

(56) References Cited

U.S. PATENT DOCUMENTS

| | | | | |
|---|---|---|---|---|
| 5,113,992 | A * | 5/1992 | Sadamori | H01L 21/67778 198/347.1 |
| 5,529,165 | A * | 6/1996 | Shupert | B65G 1/127 198/347.3 |
| 5,593,269 | A * | 1/1997 | Bernard, II | B65G 1/0485 198/469.1 |
| 5,619,911 | A * | 4/1997 | Voegtlin | A21B 1/26 126/21 A |
| 6,250,454 | B1 * | 6/2001 | Douglas | B65G 47/5113 198/347.1 |
| 6,321,899 | B1 * | 11/2001 | Hannessen | B65G 17/123 198/475.1 |
| 6,378,689 | B1 * | 4/2002 | Wellpott | B65G 47/244 198/377.01 |
| 6,554,105 | B2 * | 4/2003 | Brown | B65G 17/123 186/41 |
| 7,025,191 | B2 * | 4/2006 | Lichti | B65G 1/127 198/347.1 |
| 7,178,658 | B2 * | 2/2007 | Philipp | B65G 17/485 198/347.1 |
| 7,210,889 | B2 * | 5/2007 | McFarland | B65G 1/127 198/465.3 |
| 7,585,143 | B2 * | 9/2009 | Hanaoka | B65G 65/00 198/465.3 |
| 8,534,449 | B2 * | 9/2013 | Link | H01L 21/67706 198/377.07 |
| 9,187,258 | B2 * | 11/2015 | Zhang | B65G 23/24 |
| 9,511,939 | B2 * | 12/2016 | Zorn | A21B 1/42 |
| 10,322,877 | B2 * | 6/2019 | Belardinelli | B65G 17/18 |
| 2004/0050657 | A1 * | 3/2004 | Langenegger | B65G 47/5131 198/347.1 |
| 2004/0238326 | A1 * | 12/2004 | Lichti | B65G 1/127 198/475.1 |
| 2010/0114362 | A1 * | 5/2010 | Zumbrunn | B65G 1/133 700/218 |
| 2012/0043183 | A1 * | 2/2012 | Hannessen | B65G 47/57 198/617 |
| 2016/0145047 | A1 * | 5/2016 | Zorn | A21B 1/42 198/793 |
| 2018/0105370 | A1 * | 4/2018 | Philipp | B65G 47/57 |
| 2019/0004077 | A1 * | 1/2019 | van Mierlo | B65G 43/00 |
| 2019/0009995 | A1 * | 1/2019 | Philipp | B65G 47/57 |

FOREIGN PATENT DOCUMENTS

| | | |
|---|---|---|
| EP | 1586520 A1 | 10/2005 |
| EP | 2392 526 A1 | 12/2011 |

* cited by examiner

NORIA-TYPE DEVICE FOR TRANSPORTING SUPPORT PLATES FOR BAKERY PRODUCTS OR THE LIKE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the field of transport and conveyance of products, in particular bakery, Viennese bread, pastry and the like products.

Such a device will find a particular, but in no way restrictive, application in the transport of products in the form of dough pieces through different industrial production lines, for the treatment of said dough pieces, especially for their baking and/or their deep-freezing and/or their cooling and/or their fermentation.

More particularly, the invention relates to a noria-type device for transporting support plates for bakery products or the like comprising means for supporting said plates, cooperating on both sides of a vertical median plane with a driving means. Each driving means comprises at least one chain, belt or the like describing a close-loop circuit so as to define an ascending column of supporting means and a descending column of supporting means.

2. Description of Related Art Including Information Disclosed Under 37 CFR 1.97 and 37 CFR 1.98

Already known in the state of the art are patent documents EP 0 710 441 and WO 2015/001254, which describe, in ovens for baking bakery products or the like, such noria-type devices for conveying baking supports.

These documents describe, more particularly, an oven, which in a known manner includes a baking chamber provided with an inlet opening and an outlet opening, through said chamber passing a transport device permitting to convey plate-type cooking supports, on which dough pieces to be baked rest.

The devices described in these documents include systems for transporting support plates in the form of a noria ensuring an upward and downward circulation of said support plates within said baking chamber. Such a noria is comprised of a pair of link drive chains arranged on both sides of an axis of transporting the baking supports through the oven, each of said chains winding up at least about two direction-changing wheels, so as to describe a close-loop circuit.

This close-loop circuit described by the pair of chains then includes a first ascending chain side and a second descending chain side, both being vertical.

In addition, the noria is provided with a plurality of pairs of support arms, made integral in fastening with the drive chains, and extending perpendicular thereto.

More particularly, to each of the chains of the noria are fastened said support arms, with a regular distance between them. In addition, to a support arm of one chain corresponds a support arm of the second chain, so that on two support arms located at the same level can horizontally rest a support plate with bakery products.

Thus, an ascending column of supports is defined by all the support plates resting on the support arms located on one side of the noria, which an upward movement is imparted to through the chains, while the descending column is defined by all the support plates resting on the support arms arranged on the other side of the noria.

In this system for transporting support plate, before the pair of arms begins its rotation to descend, a plate, supported until then by a pair of arms located on the ascending column is pushed through appropriate transfer means to a pair of arms located on the side of the descending column of this noria.

At the level of the lower end, the support plates circulate on a suitable horizontal conveyor and are taken upstream by the ascending column and deposited downstream by the descending column.

The design of the device for transporting support plates, described in EP 0 710 441, which support arms are perpendicularly fastened to, leads to many mechanical stresses, namely because of the weight applied to said arms by the plates loaded with products, said weight being offset externally with respect to the vertical median axis passing through the axis of said direction-changing wheels.

Indeed, this overhang tends to cause the arms to bend downward at the level of the ascending and descending sides of the chain.

More specifically, this offset weight pushes each link internally at the level of its lower axis and externally at the level of its upper axis, deforming the vertical linearity of the chain. In order to avoid this deformation, it is necessary to considerably increase the tension applied by the direction-changing wheels, and to check it regularly.

The higher voltage requires a stronger drive and motor. In addition, this tension also causes faster wear of the various parts, namely of the links of the chain or the direction-changing wheels.

It should also be noted that it is necessary to constantly ensure the lubrication of the various parts, which increases the costs of maintenance of such a device.

In addition, it is necessary to provide, at the level of the transport means, means for transferring the support plates having reached the upper end of the noria, and hence of the ascending column, to the side of the descending column. In particular, in this document, when a support plate reaches this upper end of the noria, it is stopped so as to permit a horizontal pusher, comprised of a pair of chains actuating in a reciprocal manner a carriage provided with pushers, to push said support plate from the support arms on which it rests and corresponding to the ascending column, onto support arms of the descending column located in the same horizontal plane.

In the noria-type of transport devices of the prior art are also provided guide means, which are often doubled and in the form of a centering wheel, in order to keep the support arms in a perpendicular direction and perfectly aligned horizontally at the level of the ascending and descending stacks.

Though these guide means prevent the chain from twisting, they generate frictions increasing the wear of the links and require to increase the tension applied to the chain.

WO 2015/001254 tries namely to cope with some of these drawbacks, by providing a noria-type transport device, in which the chain is stiffened at the level of its ascending and descending sides so that the offset weight of the support plates resting on the arms no longer applies directly onto each link of the chain, but according to a single downward vertical component.

More particularly, in this state-of-the-art device, to each link is integrally fastened a base, the support arms being applied laterally against the links by means of this base. The bases are designed to be stacked on top of each other, forming then a vertical rod.

This device, although interesting and coping with some problems previously observed, does not permit to cope with all the drawbacks of the noria-type transport systems implemented in the conveying, through different units, of bakery products or the like.

Indeed, one of the persistent problems of the known devices of the state of the art resides in this transfer of the support plates, in the upper portion of the devices, from the ascending column to the descending column of the noria, implementing complex transfer means that are unreliable over time namely because of sometimes extreme temperatures, which these transfer means are subjected to, in particular when the transport systems are intended to be implanted in an oven or a deep-freezer.

In addition, it should be noted that, in the devices of the state of the art and conventionally, the cooking, fermentation, freezing chambers or the like are delimited by an insulating envelope. The latter has generally a parallelepipedal cross-section, and is closed, in the upper and lower portion, by a floor and a ceiling each having a semi-cylindrical shape. Indeed, in the upper portion, the support arms, after the transfer of the plate supporting the products from one side to the other of the noria, must describe a semicircular movement to pass from the ascending column to the descending column.

Similarly, in the lower portion, once the support plate has been evacuated onto a conveyor, the support arms describe once again a semicircular movement to pass, this time, from the descending column to the ascending column.

The rotation by 180°, performed by the support arms at the upper and lower ends of the cooking chamber or the like, to move from the ascending, respectively descending column to the descending, respectively ascending column, necessarily implies to provide a chamber volume available only to permit this rotation.

It is therefore understood that this volume is necessarily heated or cooled, in the case for example of baking or cooling chambers for the products, while said volume is not used effectively for this baking or this cooling. This lost volume, only dedicated to the rotation of the support arms, is therefore a drawback, in terms both of energy spent for maintaining the entire chamber at a suitable temperature and of space to provide in height in the operating premises intended to accommodate the transport device.

Thus, within the framework of an inventive step, in order to solve, at least in part, the problems arising namely from the transfer of support plates in the upper portion of the noria, it has been devised to completely remove this transfer by pushing from a first pair of arms at the top of the ascending column to a second pair of arms at the top of the descending column, each support plate for bakery products being, in the present invention, constantly maintained horizontally or substantially horizontally between two supporting angle brackets offset with respect to the noria and guided namely in the upper portion of said noria in order to guarantee this horizontality.

In brief, within the framework of the present invention, from its taking over until its evacuation, beyond the circuit performed on the noria, a support plate for bakery products is no longer subjected to any transfer between different support arms, thus coping with a number of drawbacks of the devices known so far.

BRIEF SUMMARY OF THE INVENTION

To this end, the present invention relates more particularly to a transport device, of the noria-type, for support plates for bakery products or the like, comprising means for supporting said plates cooperating, on both sides of a vertical median plane, with a driving means, each driving means comprising at least one chain, belt or the like, and describing a close-loop circuit so as to define an ascending column of supporting means and a descending column of supporting means, said device being characterized in that the supporting means are defined by at least one pair of supporting angle brackets on which the side edges of a support plate can rest, each driving means including at least one connecting support hinged about a horizontal axis of at least one angle bracket, said device including means for holding and guiding said angle brackets in a substantially horizontal plane at least in a transfer portion of the ascending column to the descending column along the circuit traveled by each driving means, said transport device including means for synchronized operation of said driving means and a loading and unloading conveyor extending at least under the ascending column and the descending column between said driving means.

The presence of such a loading and unloading conveyor between the driving means, namely chains, permits to load according to a continuous flow and sequentially the vertical ascending column, respectively to unload the vertical descending column, without any additional operation, namely a manual handling operation or the like, is performed on the support plates for bakery products.

Advantageously, the chain or belt of a driving means describes a close-loop circuit by partially winding up at least about two direction-changing wheels with a horizontal axis by defining an ascending chain or belt side and a descending chain or belt side, on this chain or belt, externally to the close-loop circuit described is applied in an articulated manner, at a regular distance, a bellows-like unfoldable and foldable structure, comprised of a succession of arms articulated to each other and a first end of which is hinged on the chain or belt and the other end of which carries the articulated connecting supports of said angle brackets.

In an advantageous embodiment, the articulated connecting support is defined essentially in the form of a hinging axis bearing an angle bracket.

In another, even more advantageous example, the articulated connecting support comprises a hinging axis on which a rack of several superimposed, preferably equidistant, angle brackets is mounted.

According to another peculiarity of the invention, said device includes, at the upper end of each driving means, means for assisting the transfer of the supporting means arriving at the upper end of an ascending column above a descending column, said means for assisting the transfer including a cam device, which an articulated connecting support is made to cooperate with, in order to subject the latter to a successively increasing and decreasing speed of movement, when passing from the upper end of an ascending column to the upper end of a descending column.

Most preferably, the means for assisting the transfer form the means for holding and guiding the angle brackets in a horizontal position and include at least two cam tracks each cooperating with a separate roller carried by the articulated connecting support of an angle bracket.

Yet more preferably, an articulated connecting support includes on both sides of the vertical median plane passing through its horizontal hinging axis a roller cooperating with one of the cam tracks, each roller forming furthermore, in cooperation with an adapted vertical slide, means for guiding and holding the angle brackets in a horizontal position along the vertical ascending and descending columns.

The invention also relates to a unit for processing bakery products or the like, said unit being namely of the type baking oven or fermenter or freezer or cooling tower, and including at least one transport device according to the invention as described above.

BRIEF DESCRIPTION OF THE SEVERAL VIEWS OF THE DRAWINGS

Further features and advantages of the invention will become evident from the following detailed description of non-restrictive embodiments of the invention, when referring to the attached figures.

DETAILED DESCRIPTION OF THE INVENTION

With reference to these drawings, the present invention relates to a transport device 1, of the noria-type, for support plates 2 or the like, such as namely peelboard-type push supports, small molds or also nets, these plates 2 being generally rectangular or substantially rectangular.

In the following description, the term "support plate" or "support plates" as the case may be, will be used to designate the supporting means on which bakery, Viennese bread, pastry and the like products are intended to rest for their transport through at least one processing unit of an industrial production line.

In this respect, the transport device 1 may advantageously be integrated in a processing unit of any kind, and namely in a vertical baking oven, a fermentation oven, a cooling tower, or also a deep-freezer.

It should also be noted that it is quite possible to consider that a processing unit incorporates, if necessary, a plurality of transport devices 1 according to the invention described in more detail hereinafter.

The present transport device 1, of the noria-type, for support plates 2 for bakery products essentially comprises supporting means 3 for said plates 2 for the taking over and the conveying of the latter within the device 1.

Figure 2:
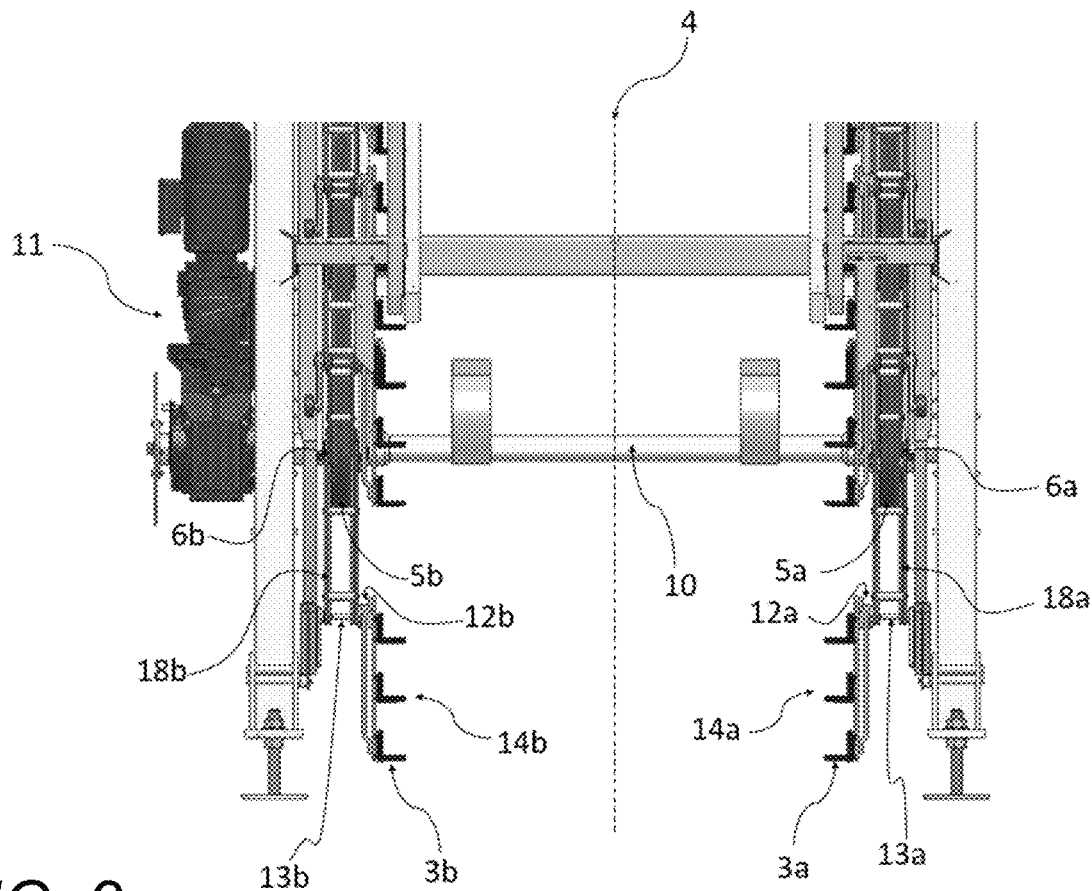
FIG. 2 schematically shows a front view of a particular embodiment of a portion of the noria-type transport device of FIG. 1, in this case the lower portion of said device.
Figure 3:
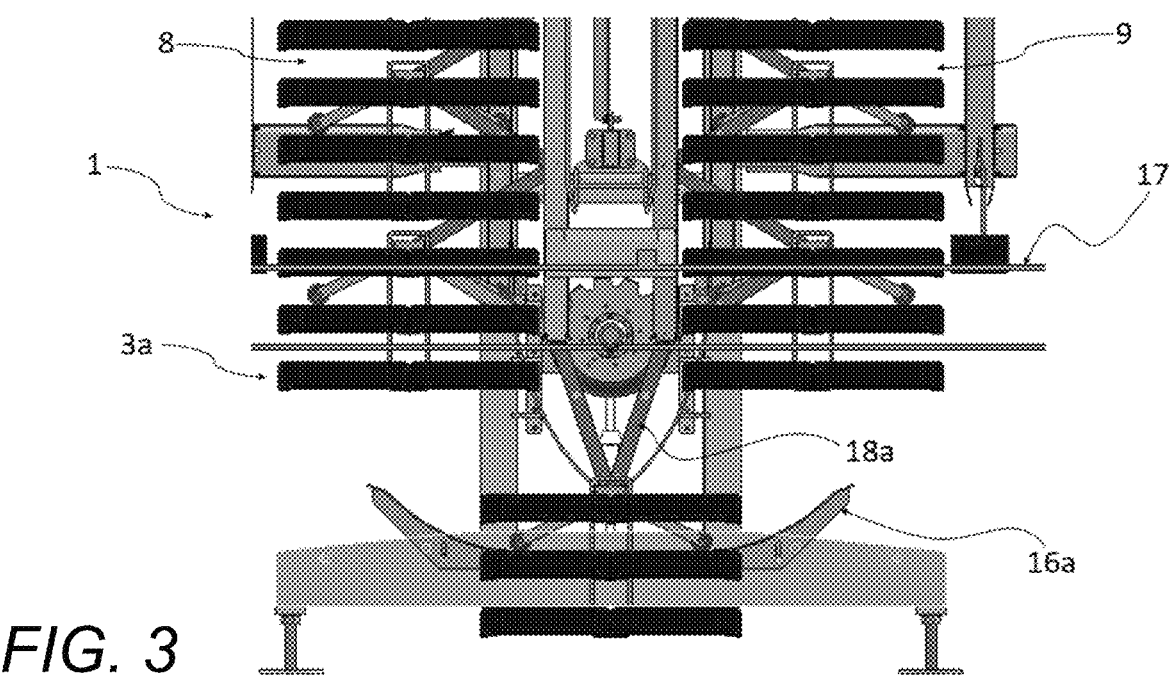
FIG. 3 schematically shows the portion of the noria-type transport device of FIG. 2 in a cross-sectional view along a vertical median plane of said device.
Figure 4:
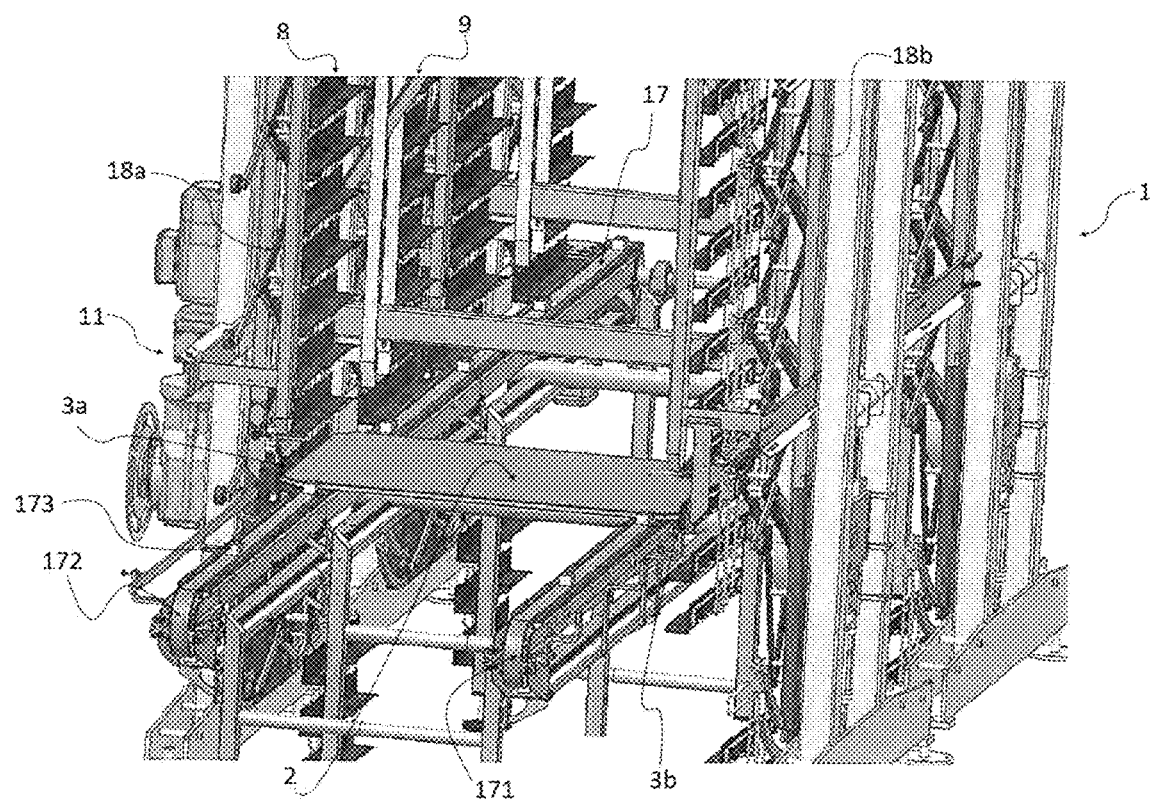
FIG. 4 schematically shows a perspective view of a particular embodiment of another portion of the noria-type transport device of FIG. 1, with illustration of the taking over of a support plate in the lower portion of said device.

According to a peculiarity of the present invention, these supporting means 3 are defined by at least one pair of supporting angle brackets 3a, 3b receiving a support plate 2 by the side edges thereof, as shown more particularly in FIGS. 2 and 4 of the attached drawings, in order to maintain said support plate 2 horizontal or substantially horizontal during its transport by means of the device 1 of the invention.

Of course, the noria-type of transport device 1 of the invention preferably comprises a plurality of such pairs of supporting angle brackets 3a, 3b on each of which can rest a support plate 2 containing products to be transported. A pair of supporting angle brackets 3a, 3b is more particularly visible in the attached FIG. 2.

The supporting means 3 for the plates 2, preferably the supporting angle brackets 3a, 3b, cooperate, on both sides of a vertical median plane 4, also visible in FIG. 2, with a driving means.

Each means for driving the supporting angle brackets 3a, 3b comprises, at least, a chain 5a, 5b respectively a belt, or the like, which preferably describes a close-loop circuit by winding up, at least partially, about at least two direction-changing wheels.

In the following description, only the term "chain" will be used, as regards the means for driving the supporting angle brackets 3a, 3b, knowing that, by this term can also be understood that the driving means comprise a belt or the like.

Figure 1:
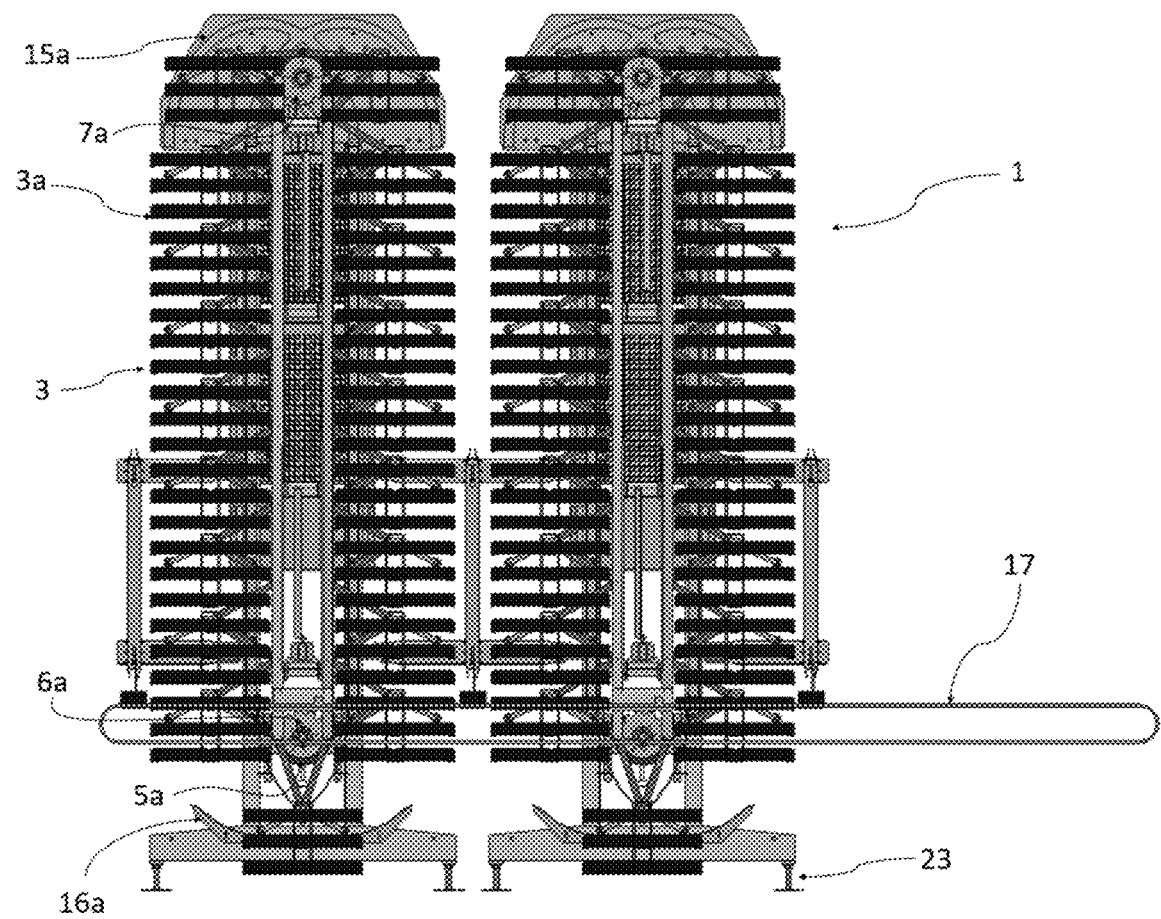
FIG. 1 schematically shows a side view of two noria-type transport devices according to the invention, according to a particular and non-restrictive embodiment, said devices being arranged one after another along a conveyor for loading and unloading support plates on which bakery products or the like rest, the plates and the products being however not shown in the figure.

Thus, the chain 5a drives the supporting angle bracket 3a cooperating with a second supporting angle bracket 3b for taking over a support plate 2, said second supporting angle bracket 3*b* being in turn driven by a chain 5*b*. As shown in FIG. 1, this chain 5*a* describes a close-loop circuit by partially winding up about at least two direction-changing wheels, preferably a lower direction-changing wheel 6*a* and an upper direction-changing wheel 7*a*. In this case, they are chain wheels, and said direction-changing wheels 6*a*, 7*a* have a horizontal axis of rotation and are located in the same vertical plane.

Likewise, on the other side of the vertical median plane 4, the chain 5*b* driving at least the supporting angle bracket 3*b* describes a close-loop circuit by partially winding up about at least the lower 6*b* and upper 7*b* direction-changing wheels, only the direction-changing wheel 6*b* positioned in the lower position of the transport device 1 being shown in FIG. 2.

Thus, by such a driving of the support plates 2 by means of chains 5*a*, 5*b* each describing a close-loop circuit are defined an ascending column 8 for supporting means 3 and a descending column 9 for supporting means 3, each supporting means 3 being formed, in the invention, by a pair of supporting angle brackets 3*a*, 3*b*.

In addition, at the level of each chain 5*a*, 5*b* describing a close-loop circuit are defined a first ascending chain side 5*a*, 5*b* and a second descending chain side 5*a*, 5*b*.

These two chain or belt sides 5*a*, 5*b* correspond to the chain portions 5*a*, 5*b* located between the wheels 6*a*, 7*a* and 6*b*, 7*b*, respectively, and extending vertically.

It should also be noted that, according to a peculiarity of the invention, the transport device 1, of the noria-type, includes synchronized operating means for the driving means, in this case chains 5*a* and 5*b*.

Most preferably, in order to ensure the synchronous operation of said chains 5*a* and 5*b*, at least two direction-changing wheels located in the same horizontal plane, for example the lower direction-changing wheels 6*a*, 6*b*, are mounted on one and the same horizontal drive shaft 10, shown in FIG. 2, said shaft 10 cooperating furthermore with suitable motorized driving means 11.

Such an embodiment should however not be considered as being restrictive for the invention. Indeed, it is quite possible to consider that the horizontal drive shaft is provided in the upper portion of the transport device 1 of the invention, for driving, in a synchronized way, the upper direction-changing wheels 7*a* and 7*b*.

Thus, the ascending column 8 of supporting means 3 for support plates 2 is defined by all said supporting means 3, located on one side of the noria, which an upward movement is imparted to through the chains 5*a*, 5*b*, under the action for example of adapted driving means 11, while the descending column 9 is defined by all the supporting means 3 arranged on the other side of the noria and which a downward movement is imparted to, it being understood that, in the invention, the supporting means 3 each consist of a pair of supporting angle brackets 3*a*, 3*b*.

According to another peculiarity of the invention, each driving means, preferably each chain 5*a*, 5*b* located on both sides of the vertical median axis 4, includes at least a connecting support 12*a* 12*b* hinged about a horizontal axis 13*a*, 13*b* of at least one supporting angle bracket 3*a*, 3*b* on said chain 5*a*, 5*b*, respectively. Preferably, each chain 5*a*, 5*b* includes a plurality of such connecting supports 12*a*, 12*b*, so as to be able to convey a large number of support plates 2 for bakery products by means of the transport device 1 of the invention.

Figure 5A:
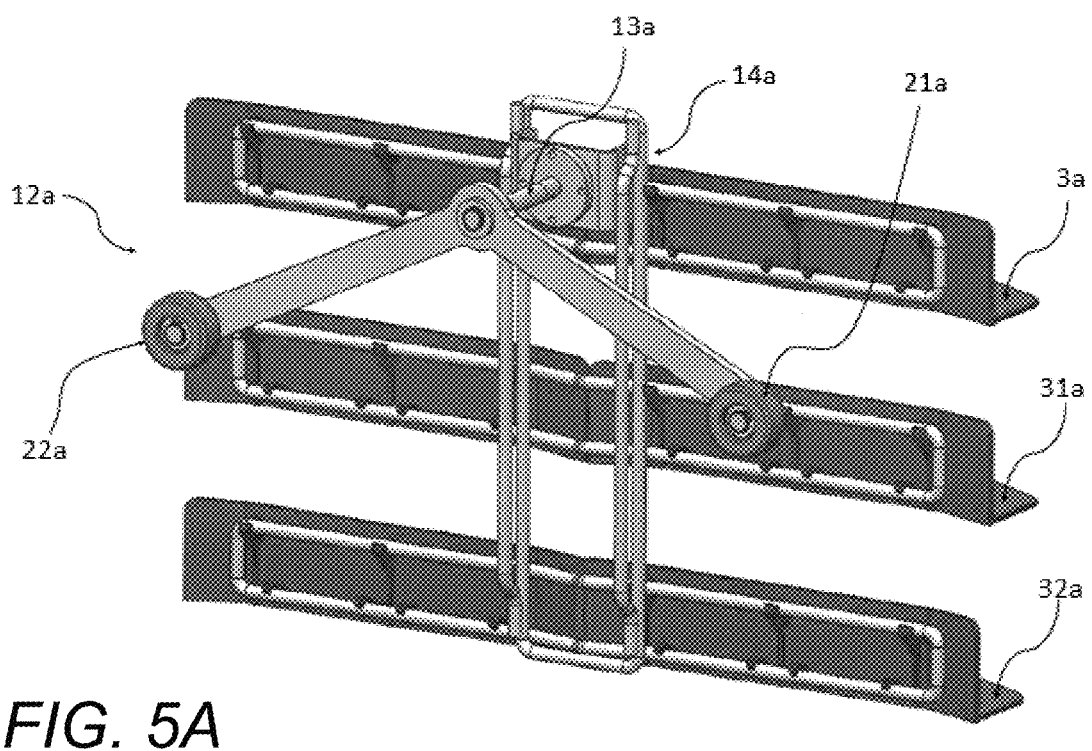
FIG. 5a schematically shows a perspective view of a particular embodiment of another portion of the noria-type transport device of FIG. 1, in this case an articulated connecting support being in the form of a rack of three superimposed and arranged substantially equidistant angle brackets, said rack being fitted on a hinging axis.
Figure 5B:
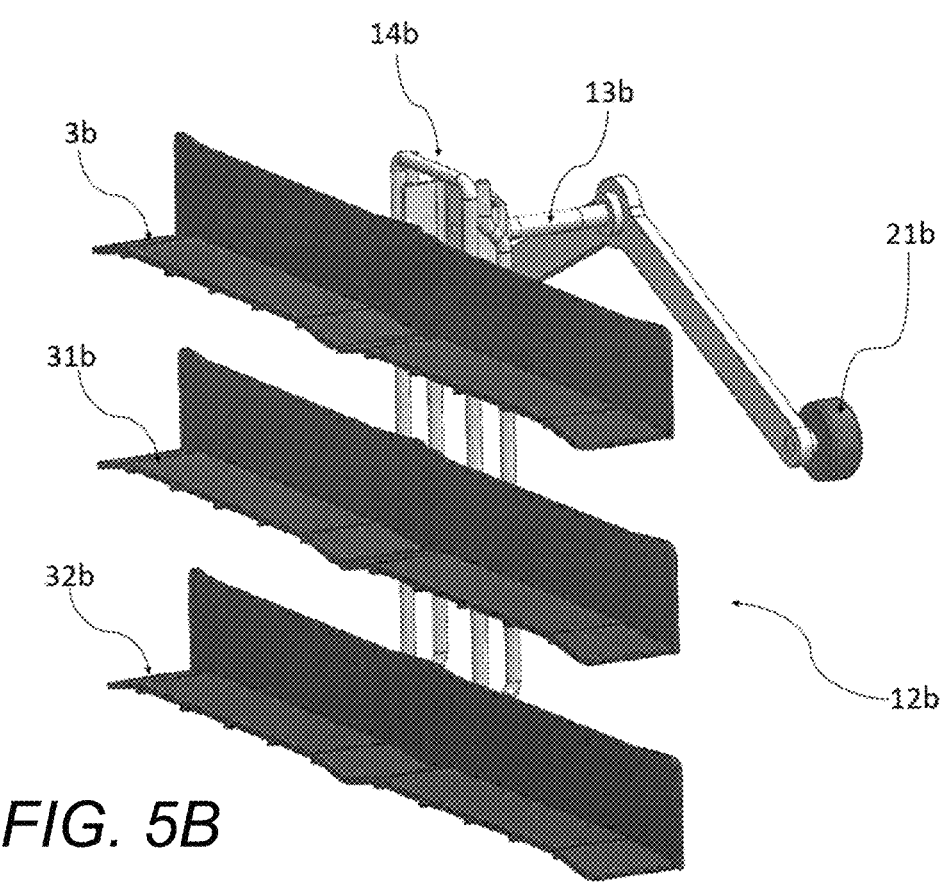
FIG. 5b schematically shows a perspective view of a connecting support consisting of a rack of three superimposed equidistant angle brackets fitted on a hinging axis, said support being intended to face the connecting support of FIG. 5a on the transport device of the invention.

A non-restrictive exemplary embodiment of such a connecting support 12*a*, 12*b* is shown in FIGS. 5*a* and 5*b* of the attached drawings. FIG. 5*a* shows a first connecting support 12*a* intended to be fitted on the chain 5*a*, while FIG. 5*b* shows a second connecting support 12*b*, identical to the connecting support 12*a*, and intended to be provided on the chain 5*b* in front of said connecting support 12*a*.

In this example, each of the articulated connecting supports 12*a*, 12*b* includes a hinging axis 13*a*, 13*b*, respectively, on which is mounted a rack 14*a*, 14*b* of three supporting angle brackets 3*a*, 31*a*, 32*a* on one side and 3*b*, 31*b*, 32*b* on the other side.

Advantageously, when an articulated connecting support 12*a*, 12*b* comprises a rack 14*a*, 14*b* of several angle brackets 3*a*, 31*a*, 32*a* and 3*b*, 31*b*, 32*b*, respectively, the latter are positioned equidistant or substantially equidistant from each other.

For the sake of simplification, in the following description, a supporting angle bracket is systematically designated by reference numeral 3*a*, even when the figures being described systematically represent a rack 14*a* or 14*b* including a plurality of such supporting angle brackets.

It is indeed also contemplated that an articulated connecting support 12*a*, 12*b* includes a rack 14*a*, 14*b* having a different number of angle brackets, for example two supporting angle brackets, four supporting angle brackets or more.

In another equally advantageous embodiment of the noria-type transport device 1 according to the invention, not shown in the figures, an articulated connecting support 12*a*, 12*b* is defined essentially in the form of a hinging axis 13*a*, 13*b* carrying a single angle bracket 3*a*, 3*b*.

Anyway, a connecting support 12*a* fitted on the chain 5*a* is driven by the latter synchronously with a connecting support 12*b* fitted on the chain 5*b* so that two supporting angle brackets 3*a*, 3*b*, located on both sides of the vertical median plane 4, remain in the same horizontal plane all along the close-loop circuit they describe in the transport device 1, i.e. on the ascending column 8 and on the descending column 9 of the supporting means 3.

In a particularly advantageous embodiment, which is the one shown in the figures of the attached drawings, externally to the close-loop circuit described by each driving means, in this case each chain 5*a*, 5*b*, is applied, in a hinged way and at a regular distance, to each of these chains 5*a*, 5*b* a bellow-like unfoldable and foldable structure 18*a*, 18*b*, respectively.

Each of these bellow-like structures 18*a*, 18*b* is comprised of a succession of articulated arms, namely to each other.

Figure 7:
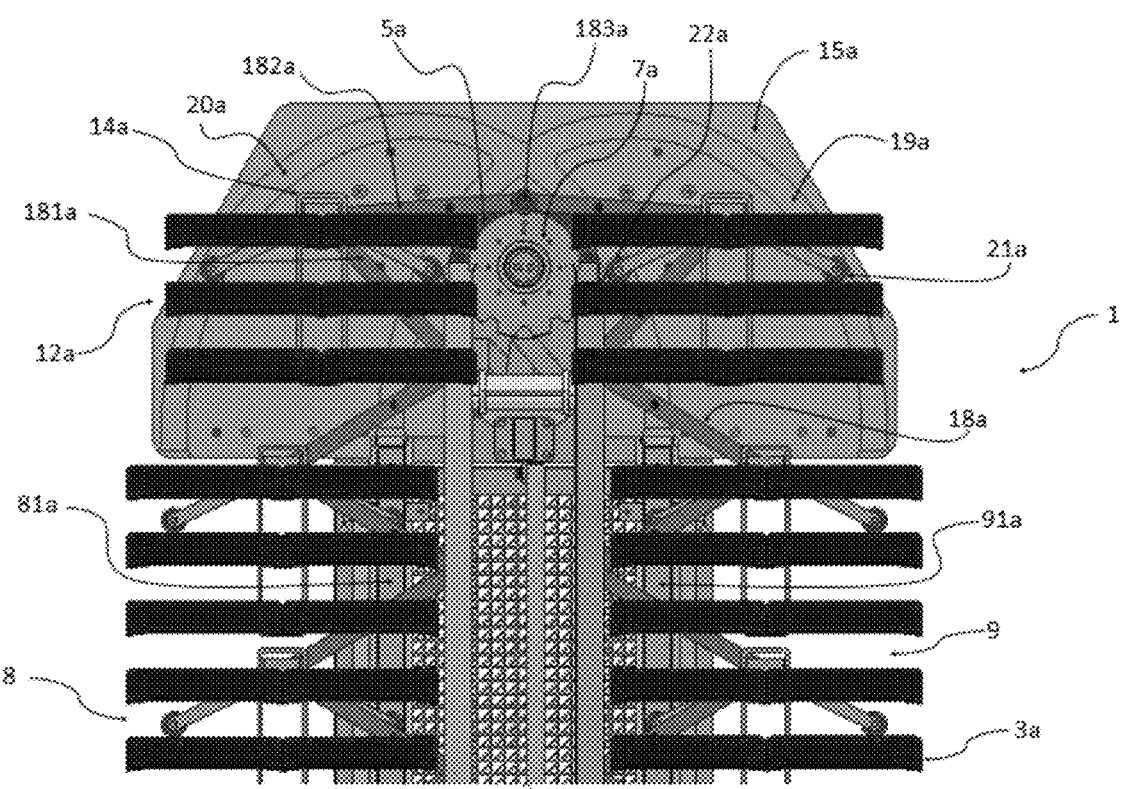
FIG. 7 schematically shows a side view similar to FIG. 6, in a cross-sectional view along a vertical median plane of said device.

By way of an example, FIG. 7 shows namely two arms 181*a*, 182*a* of the bellow-like structure 18*a* hinged to each other. A first end of each of the arms 181*a*, 182*a* is articulated at the level of the chain 5*a* at the level of a hinging shaft (referenced 183*a* for the end of the arm 182*a*), while the second end of said arms 181*a*, 182*a* carries, at the level of the joint between said two arms 181*a*, 182*a* and through their hinging axes 13*a*, the connecting supports 12*a* including, in the example being shown, a rack 14*a* of three angle brackets 3*a*.

It should also be noted, according to a peculiarity of the device for transporting 1 the support plates 2 of the invention, that the latter also includes means for holding and guiding 15*a*, 15*b* supporting angle brackets 3*a*, 3*b* in a horizontal or substantially horizontal plane at least in a portion for transferring said angle brackets from the ascending column 8 to the descending column 9, in the upper portion of said device 1.

Yet more preferably, the device 1 of the invention includes both means for holding and guiding the angle brackets 3*a*, 3b in the transfer portion from the ascending column 8 to the descending column 9 and means 16a for holding and guiding these angles 3a, 3b horizontal during their transfer in the lower portion of said device 1, from the descending column 9 to the ascending column 8, whereby these means 16a may be identical or similar to the holding and guiding means 15a, 15b positioned in the upper portion.

It should also be noted that, in the case where the device includes such holding and guiding means 16a in the lower transfer portion, they can be simplified in comparison with the holding and guiding means 15a in the transfer portion from the ascending column 8 to the descending column 9 in the upper portion of the device 1, for the reasons set forth below.

Indeed, preferably, the support plates 2 of the products to be transported continuously arrive through a conveyor 17 for loading and unloading the transport device 1 of the invention, said conveyor 17 extending at least under the ascending column 8 and under the descending column 9, between the driving means formed namely by the chains 5a, 5b of the transport device 1 of the invention.

This conveyor 17, shown namely in FIG. 4, preferably includes two chains 171, 172 running parallel and substantially horizontally, on which the support plates 2 receiving the bakery products are successively and regularly arranged. Each of these chains 171, 172 is provided with a plurality of cleats 173, which, when said chains 171, 172 are put into motion, push a support plate 2 at the bottom of the ascending column 8 of support means 3.

At this level, the chains 171,172 of the conveyor stop and said support plate 2 is transferred directly, without further manipulation, from the conveyor 17 to the ascending column 8 of the device 1, between two supporting angle brackets 3a, 3b, each of the latter supporting a side edge of said support plate 2. The latter is then driven vertically upwards, along said ascending column 8, to the upper end thereof, where the plate 2 will then be transferred to the descending column 9 at the level of a transfer portion where said plate 2 is held in a horizontal position, still on said brackets 3a, 3b, the latter being in turn held horizontally through the holding and guiding means 15a, 15b.

It is of course understood here that, in the present invention, unlike in the state of the art, the support plate 2 is no longer pushed from one column, in this case the ascending column 8, to the descending column 9. The support plate 2 is held horizontally, or substantially horizontally, on the same supporting angle brackets 3a, 3b, by which it has originally taken over at the bottom of the ascending column 8, and on the entire path that it performs in the noria-type transport device 1 of the invention. In this way, the operations of passing from a first pair of support arms to a second pair of arms in the upper part of the ascending column are avoided, with the drawbacks these operations necessarily imply, namely the presence of complex transfer mechanisms likely to deteriorate over time, as well as the volume lost in the baking chamber or the like to permit the rotation of said arms.

Once the transfer of the support plate 2 has been performed in the upper portion of the device 1, the latter is driven downward on the other side of the noria until it reaches again the loading and unloading conveyor 17, which extends both under the ascending column 8 and under the descending column 9. At that level, the support plate 2 is deposited by the descending column 9 directly onto said conveyor 17, in order to then be, for example, evacuated from the transport device 1.

In a contemplated exemplary embodiment of the transport device 1 of the invention, the latter includes a single loading and unloading conveyor 17, which conveys the support plates 2 on a first ascending column 8 and which takes these same plates 2 from a first descending column 9 before conveying them to a second ascending column and then taking them from a second descending column. In this case, first chain-type driving means describing a looped circuit define the first ascending and descending columns and second similar driving means defining the second ascending and descending columns. Such an embodiment is shown for example in the attached FIG. 1.

Anyway, once the support plate 2 has been deposited on the conveyor 17, the two supporting angle brackets 3a, 3b then continue their circuit under the conveyor 17 until a transfer portion from the descending column 9 to the ascending column 8, in the lower portion of the noria.

The loading and unloading conveyor 17 preferably has a sequential operation, namely for successively bringing the support plates 2 at the level of the ascending column 8 of support means 3 and then for successively discharging these plates 2 from the lower column 9. This conveyor 17 permits however to bring the support plates 2 without interruption at the bottom of the ascending column 8. The chains 5a, 5b of the noria can, in turn, also be sequentially operating in order to wait for the positioning between two supporting angle brackets 3a, 3b, of a support plate 2 at the bottom of the ascending column 8 or to wait for the unloading of such a plate 2 from the descending column 9 to the conveyor 17.

However, the chains 5a, 5b of the driving means 1 of the noria-type transport device 1 of the invention can also have an uninterrupted operation, with an operation speed servo-control between the noria and the loading and unloading conveyor 17.

Anyway, it is understood that, at the level of the lower transfer portion, between the descending and ascending 9 columns 8, the supporting angle brackets 3a, 3b no longer support the support plate 2 containing products, unlike the upper transfer portion from the ascending column 8 to the descending column 9. Therefore, the means for holding and guiding 16a said supporting angle supports 3a, 3b in a horizontal plane can be simplified in the lower portion, where no plates 2 are present, in comparison with the holding and guiding means 15a, 15b where the supporting angle brackets 3a, 3b carry such a plate 2.

The noria-type transport device 1 of the invention also includes, at the upper end of each driving means, pairs of supporting angle brackets 3a, 3b, means for assisting the transfer of the latter when they reach the upper end of the ascending column 8 above the descending column 9.

Preferably, these means for assisting the transfer include a cam device, which cooperates with an articulated connecting support 12a, 12b, in order to subject said support 12a, 12b to a successively increasing, then decreasing speed of movement when passing the upper end of the device 1, from the top of the ascending column 8 to the top of the descending column 9.

Yet more preferably, and according to the particular embodiment shown in the figures of the attached drawings, the above-mentioned means for assisting the transfer also form the means for holding and guiding 15a, 15b the angle brackets 3a, 3b in a horizontal position.

In this embodiment, these means for assisting the transfer 15a, 15b, also fulfilling a function of holding and guiding the articulated connecting supports 12a, 12b, include two cam tracks.

Figure 6:
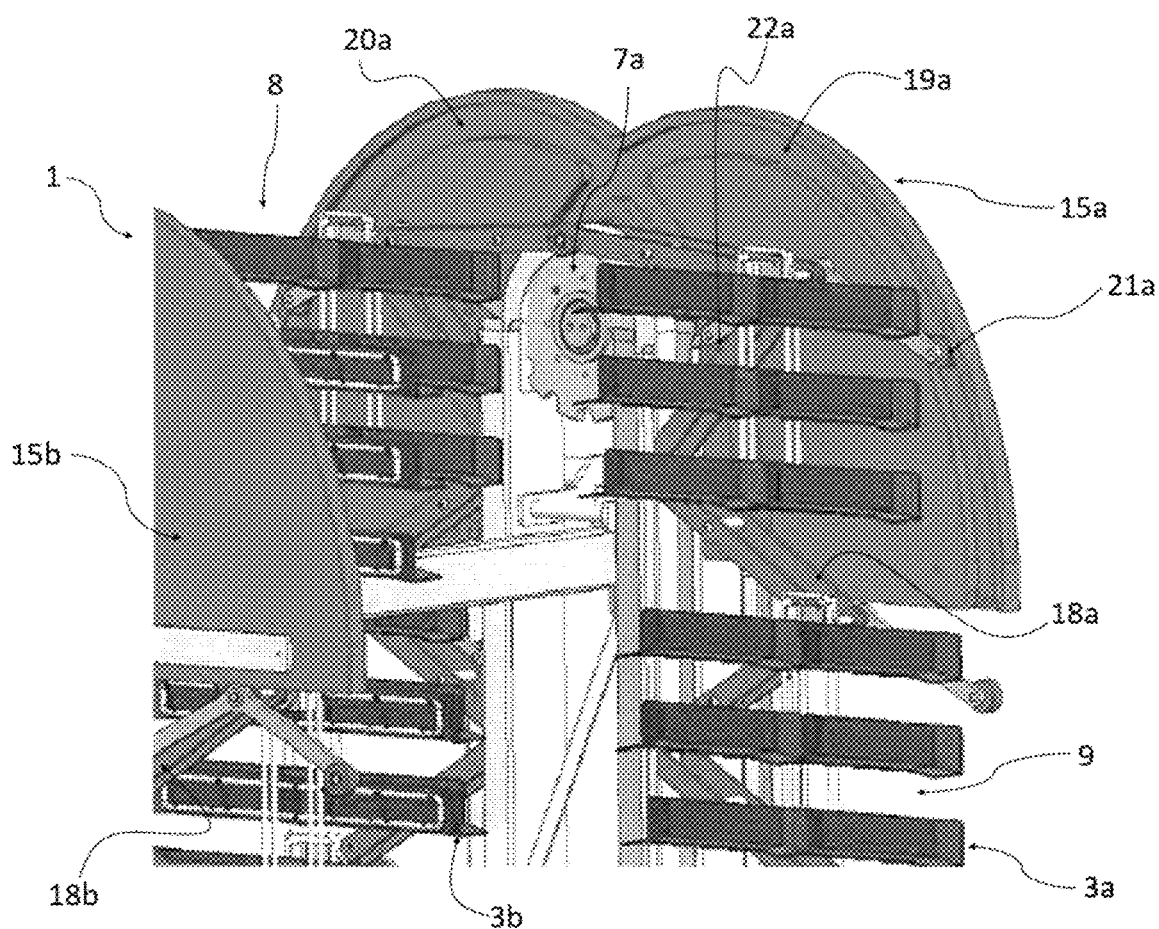
FIG. 6 schematically shows a perspective view of a particular embodiment of a portion of the noria-type transport device of FIG. 1, in this case the means for assisting the transfer from an ascending column to a descending column of the supporting means in the upper portion of said transport device.

In FIGS. 6 and 7 are shown the two cam tracks 10a and 20a of the means for assisting the transfer 15a, it being understood that, on the other side of the vertical median plane 4 of the device 1 of the invention, the means for assisting the transfer 15b also include two identical cam tracks, the latter being however not visible in said figures.

Each of these cam tracks 10a and 20a cooperates with a roller 21a, 22a, respectively, for guiding and maintaining horizontal angles 3a, 3b supporting the plates 2 during the transfer from a column 8 to the other one 9. In addition, the configuration of these means 15a, 15b in the form of cam tracks permits to confer to two articulated connecting supports 12a, 12b facing each other and carrying at least one support plate 2, through at least one pair of angle brackets 3a, 3b, and reaching the level of the transfer portion between the ascending 8 and descending 9 columns, an acceleration with respect to the following articulated connecting supports, in the direction of movement of the chains 5a, 5b. Indeed, by means of this double guide, a hinging point between two arms 181a, 182a of the bellow-like unfoldable and foldable structure 18a is brought closer to the chain 5a, and this results into a separation of two successive connecting supports 12a by the above-evoked acceleration. Of course, since the two chains 5a, 5b have a synchronous operation, an identical kinematics is observed simultaneously for the elements, in particular the articulated arms, of the structure 18b, as well as for the connecting support 12b facing each other of the articulated structure 18a and the support 12a, respectively, any shock or collision between two successive articulated connecting supports during the passing by of this transfer portion is thus avoided.

As shown in the figures, said cam tracks 10a and 20a are advantageously defined by guiding grooves carried by a flange, or a side plate, in the upper portion of the noria-type transport device 1 according to the present invention.

Even more advantageously, the inlet of said guiding grooves defining the cam tracks 10a, 20a is beveled in order to facilitate the entering of the rollers 21a, 22a into said grooves and to guarantee a horizontality of the support plates 2 all along the path taken in the transport device 1.

Preferably and as shown more particularly in FIGS. 5a and 5b, these rollers 21a, 22a (only one roller 22b being visible in FIG. 5b), cooperating with the cam tracks 10a, 20a, are carried by an articulated connecting support 12a, 12b, on both sides of a vertical median plane passing through the horizontal hinging axis 13a, 13b, respectively.

In a most preferred embodiment, and shown in the attached figures, each roller 21a, 22a is likely to cooperate, either on the first ascending chain side or on the second descending chain side, with an adapted vertical slide so as to form means for guiding the articulated connecting supports 12a and means for maintaining horizontal the supporting angle bracket or brackets 3a carried by said articulated connecting means 12a.

Thus, the noria-type transport device 1 according to the invention advantageously includes, on the one hand, a first vertical slide 81a cooperating with the roller 21a along the ascending vertical column 8 of support means and, on the other hand, a second vertical slide 91a cooperating with the roller 22a along the descending vertical column 9, in particular when referring to FIG. 7.

Thus, during the upward movement in the device 1, the roller 21a preferably cooperates with the slide 91a before cooperating, during the transfer from the ascending column 8 to the descending column 9, with the cam track 10a. Once it has left this cam track 10a, along the descending column 9, the roller 21a is no longer in cooperation with a vertical slide, the guiding having been taken over by the roller 22a, which is, in turn, guided, when leaving the cam track 20a, by the vertical slide 91a in the downward movement, while it was not guided along the ascending column 8.

Of course, even though only one side of the transport device 1 of the invention is shown as regards the means for guiding and maintaining the angle brackets in a horizontal position along the ascending 8 and descending 9 columns on the side of the chain 5a, such means, in the form of vertical slides similar to the slides 81a, 91a, are also provided on the side of the chain 5b.

Advantageously, the transport device 1 of the invention rests on the floor through feet 23 or any other support structure permitting to preserve a free space in the lower portion of said device 1 in order to permit the passing of the supporting angle brackets 3a, 3b from the descending column 9 to the ascending column 8.

We claim:

1. The transport device, of the noria-type, for support plates for bakery products, comprising
    means for supporting plates;
    a driving means cooperative with said means for supporting on both sides of a vertical median plane,
    wherein each driving means comprises at least one chain forming a close-loop circuit so as to define an ascending column and a descending column,
    wherein the means for supporting means are comprised of at least one pair of supporting angle brackets on which the side edges of a support plate can rest,
    wherein each driving means comprises at least one connecting support hinged about a horizontal axis of at least one angle bracket;
    means for holding and guiding said angle brackets in a substantially horizontal plane at least in a transfer portion of the ascending column to the descending column along the circuit traveled by each driving means; and
    means for synchronized operation of said driving means and a loading and unloading conveyor extending at least under the ascending column and the descending column between said driving means.

2. The transport device, of the noria-type, according to claim 1, wherein the chain or belt of a driving means describes a close-loop circuit by partially winding up at least about two direction-changing wheels with a horizontal axis by defining an ascending chain or belt side and a descending chain, on this chain or belt, externally to the close-loop circuit described is applied in an articulated manner, at a regular distance, a bellows-like unfoldable and foldable structure, comprised of a succession of arms articulated to each other and a first end of which is hinged on the chain or belt and the other end of which carries the articulated connecting supports of said angle brackets.

3. The transport device, of the noria-type, according to claim 1, wherein the articulated connecting supports are essentially defined in the form of a hinging axis carrying an angle bracket.

4. The transport device, of the noria-type, according to claim 1, wherein the articulated connecting supports comprises a hinging axis on which is fitted a rack of several superimposed, equidistant angle brackets.

5. The transport device, of the noria-type, according to claim 1, further comprising:
    at the upper end of each driving means, means for assisting the transfer of the supporting means arriving at the upper end of an ascending column above a descending column, said means for assisting the transfer including a cam device, which an articulated connecting support is made to cooperate with, in order to subject the latter to a successively increasing and decreasing speed of movement, when passing from the upper end of an ascending column to the upper end of a descending column.

6. The transport device, of the noria-type, according to claim 1, wherein the means for assisting the transfer form the means for holding and guiding the angle brackets in a horizontal position and include at least two cam tracks each cooperating with a separate roller carried by the articulated connecting support of an angle bracket.

7. The transport device, of the noria-type, according to claim 1, wherein an articulated connecting support comprises on both sides of the vertical median plane passing through its horizontal hinging axis a roller cooperating with one of the cam tracks, each roller forming furthermore, in cooperation with an adapted vertical slide, means for guiding and holding the angle brackets in a horizontal position along the vertical ascending and descending columns.

* * * * *